United States Patent
Veldhuizen

(10) Patent No.: US 10,430,409 B2
(45) Date of Patent: Oct. 1, 2019

(54) MAINTENANCE OF ACTIVE DATABASE QUERIES

(71) Applicant: Infor (US), Inc., New York, NY (US)

(72) Inventor: Todd L. Veldhuizen, Waterloo (CA)

(73) Assignee: INFOR (US), INC., New York, NY (US)

( * ) Notice: Subject to any disclaimer, the term of this patent is extended or adjusted under 35 U.S.C. 154(b) by 569 days.

(21) Appl. No.: 15/095,826

(22) Filed: Apr. 11, 2016

(65) Prior Publication Data

US 2016/0259823 A1    Sep. 8, 2016

Related U.S. Application Data

(63) Continuation of application No. 13/722,067, filed on Dec. 20, 2012, now Pat. No. 9,424,304.

(51) Int. Cl.
*G06F 17/30* (2006.01)
*G06F 16/2453* (2019.01)
*G06F 16/245* (2019.01)
*G06F 16/23* (2019.01)

(52) U.S. Cl.
CPC .... *G06F 16/24539* (2019.01); *G06F 16/2308* (2019.01); *G06F 16/2379* (2019.01); *G06F 16/245* (2019.01); *G06F 16/24537* (2019.01)

(58) Field of Classification Search
CPC ......... G06F 17/30457; G06F 17/30348; G06F 17/30377; G06F 17/30424; G06F 17/30454; G06F 16/24539; G06F 16/2379; G06F 16/245; G06F 16/24537; G06F 16/2308
See application file for complete search history.

(56) References Cited

U.S. PATENT DOCUMENTS

| | | | |
|---|---|---|---|
| 5,276,872 A | 1/1994 | Lomet et al. | |
| 5,280,612 A | 1/1994 | Lorie et al. | |
| 5,325,525 A | 6/1994 | Shan et al. | |
| 5,717,921 A | 2/1998 | Lomet et al. | |
| 5,758,356 A | 5/1998 | Hara et al. | |
| 6,134,543 A | 10/2000 | Witkowski et al. | |
| 6,205,451 B1 * | 3/2001 | Norcott | G06F 17/30457 |

(Continued)

FOREIGN PATENT DOCUMENTS

WO    2008137227 A1    11/2008

OTHER PUBLICATIONS

Candan et al., Enabling Dynamic Content Caching for Database-Driven Web Sites, ACM SIGMOD 2001, May 21-24, 2001, retrieved Sep. 24, 2018, retrieved from the Internet <URL: https://dl.acm.org/citation.cfm?id=375736> (Year: 2001).*

(Continued)

*Primary Examiner* — Tyler J Torgrimson
(74) *Attorney, Agent, or Firm* — Blank Rome LLP

(57) ABSTRACT

An aspect includes a method for maintaining active queries. The method includes executing a query based on data items in at least two relations in a database. The executing includes outputting a query result and control information associated with the query. The query result and the control information are recorded. A notification that at least one of the data items has been updated subsequent to the executing is received. The query result is modified, responsive to the control information, to reflect the data items that were updated subsequent to the executing.

20 Claims, 4 Drawing Sheets

(56) References Cited

U.S. PATENT DOCUMENTS

| | | | |
|---|---|---|---|
| 6,272,502 B1* | 8/2001 | Lieuwen | G06F 17/30383 |
| 6,353,828 B1 | 3/2002 | Ganesh et al. | |
| 6,353,835 B1 | 3/2002 | Lieuwen | |
| 6,356,890 B1 | 3/2002 | Agrawal et al. | |
| 6,356,891 B1 | 3/2002 | Agrawal et al. | |
| 6,360,219 B1 | 3/2002 | Bretl et al. | |
| 6,363,387 B1 | 3/2002 | Ponnekanti et al. | |
| 6,366,903 B1 | 4/2002 | Agrawal et al. | |
| 6,484,159 B1 | 11/2002 | Mumick et al. | |
| 6,484,172 B1 | 11/2002 | Lee et al. | |
| 6,510,422 B1 | 1/2003 | Galindo-Legaria et al. | |
| 6,708,179 B1 | 3/2004 | Arora | |
| 6,763,352 B2 | 7/2004 | Cochrane et al. | |
| 6,868,414 B2 | 3/2005 | Khanna et al. | |
| 6,882,993 B1* | 4/2005 | Lawande | G06F 17/30383 707/714 |
| 6,889,358 B1 | 5/2005 | Lieuwen et al. | |
| 6,983,291 B1 | 1/2006 | Cochrane et al. | |
| 7,007,006 B2 | 2/2006 | Zilio et al. | |
| 7,089,253 B2 | 8/2006 | Hinshaw et al. | |
| 7,139,783 B2 | 11/2006 | Hinshaw et al. | |
| 7,146,366 B2 | 12/2006 | Hinshaw et al. | |
| 7,181,453 B2 | 2/2007 | Ronstrom | |
| 7,290,214 B2 | 10/2007 | Sidle et al. | |
| 7,293,028 B2 | 11/2007 | Cha et al. | |
| 7,490,084 B2 | 2/2009 | Kothuri et al. | |
| 7,523,462 B1 | 4/2009 | Nesamoney et al. | |
| 7,677,441 B2 | 3/2010 | Bernstein et al. | |
| 7,739,262 B2 | 6/2010 | Larson et al. | |
| 7,769,770 B2 | 8/2010 | Denuit et al. | |
| 7,792,839 B2 | 9/2010 | Hrle et al. | |
| 7,797,356 B2 | 9/2010 | Iyer et al. | |
| 7,805,420 B2 | 9/2010 | Kapoor et al. | |
| 7,890,497 B2 | 2/2011 | Folkert et al. | |
| 7,895,186 B2 | 2/2011 | Yu | |
| 7,930,297 B2 | 4/2011 | Yu et al. | |
| 8,065,269 B2 | 11/2011 | Nice et al. | |
| 8,176,023 B2 | 5/2012 | Graefe | |
| 8,359,325 B1 | 1/2013 | Gui et al. | |
| 2003/0101183 A1 | 5/2003 | Kabra et al. | |
| 2003/0212789 A1 | 11/2003 | Hamel et al. | |
| 2005/0091180 A1 | 4/2005 | Peleg et al. | |
| 2005/0210010 A1 | 9/2005 | Larson et al. | |
| 2006/0036580 A1 | 2/2006 | Stata et al. | |
| 2006/0218123 A1 | 9/2006 | Chowdhuri et al. | |
| 2006/0253483 A1 | 11/2006 | Yu | |
| 2006/0294156 A1 | 12/2006 | Tatemura et al. | |
| 2007/0033160 A1 | 2/2007 | Santosuosso | |
| 2007/0226196 A1 | 9/2007 | Adya et al. | |
| 2007/0226203 A1 | 9/2007 | Adya et al. | |
| 2008/0098033 A1 | 4/2008 | Farrar et al. | |
| 2008/0270489 A1 | 10/2008 | Kharatishvili et al. | |
| 2009/0019001 A1 | 1/2009 | Thiyagarajan et al. | |
| 2009/0083238 A1 | 3/2009 | Chaudhuri et al. | |
| 2009/0210429 A1 | 8/2009 | Agrawal et al. | |
| 2009/0216727 A1 | 8/2009 | Dozoretz et al. | |
| 2010/0198810 A1 | 8/2010 | Graefe et al. | |
| 2011/0137875 A1 | 6/2011 | Ziauddin et al. | |
| 2012/0047117 A1 | 2/2012 | Nica | |
| 2012/0066210 A1 | 3/2012 | Mukerjee et al. | |
| 2013/0166523 A1 | 6/2013 | Pathak et al. | |

OTHER PUBLICATIONS

Office Action from related Japanese Patent Application No. 2015-549688, dated Apr. 4, 2017, 4 pgs.

Matono et al., Bound Merge Join: A Skippable Join Algorithm Between an Extended B+ Trees, The 2nd Forum on Data Engineering and Information Management (DEIM 2010) Proceedings, Japan, Technical Group on Data Engineering in Institute of Electronics, Information and Communication Engineers, May 25, 2010, pp. 1-8.

European Patent Office, Extended European Search Report on EP13863961, dated Jul. 14, 2016, 8 pgs., The Hague.

Agrawal et al., "Automated Selection of Materialized Views and Indexes for SQL Databases", Microsoft Research; Proceedings of the 26th International Conference on Very Large Databases, Cairo, Egypt, 2000, 10 pages.

Chen et al., Detection and Correction of Conflicting Source Updates for View Maintenance, Worcester Polytechnic Undated, 12 pages.

Chen, "Intelligent Data Warehousing From Data Preparation to Data Mining: Chapter 7. Advances in materialized views", Copyright (c) 2010; pp. 117-183.

Gupta et al., "Selection and Maintenance of Views in a Data Warehouse", Gupta, PhD Dissertation, Stanford University, Sep. 1999, 124 pages.

Karde et al., "Selection & Maintenance of Materialized View and It's Application for Fast Query Processing A Survey", International Journal of Computer Science and Engineering Survey, v. 1, n. 2, Nov. 2010, 584 pages.

Kawaguchi et al., "Implementing Incremental View Maintenance in Nested Data Models", Undated, 20 pages.

Kuno et al., "Deferred Maintenance of Indexes and of Materialized Views", Lecture Notes in Computer Science, Databases in Networked Information Systems, v. 7108, (2011), pp. 213-232.

Oracle Database "Data Warehousing Guide", 11g Release 1 (11.1), Oracle (R), Sep. 2007, 584 pages.

An Oracle White Paper, "Database Performance with Oracle Database 10g Release 2", May 2005, 29 pages.

Sarma et al., "Live: A Lineage-Supported Versioned DBMS", Stanford University, Undated, 13 pages.

Zhang et al., "Data Warehouse Maintenance Under Concurrent Schema and Data Upates", Computer Science Technical Report Series, Worcester Polytechnic Institute, Aug. 1998, 30 pages.

Zhou et al. "Lazy Maintenance of Materialized Views", Microsoft Research, Very Large Database Endowment, Vienna, Austria, Sep. 23-28, 2007, 12 pages.

International Search Report and Written Opinion for International Application No. PCT/US2013/076483, International Filing Date: Dec. 19, 2013, dated Apr. 11, 2014, 11 pages.

Zhuge et al. "Multiple View Consistency for Data Warehousing", IEEE, Computer Science Department, Stanford University, 1997, 1063-6382/97, pp. 289-300.

\* cited by examiner

MAINTENANCE OF ACTIVE DATABASE QUERIES

CROSS REFERENCE TO RELATED APPLICATIONS

This application is a continuation application claiming priority under 35 U.S.C. § 120 to U.S. patent application Ser. No. 13/722,067, filed 20 Dec. 2012, and entitled "MAINTENANCE OF ACTIVE DATABASE QUERIES," which is hereby incorporated by reference as if fully set forth herein.

BACKGROUND

The present invention relates to database queries, and, more specifically, to the maintenance of active database queries.

Database management systems make it possible for users to store and update large collections of information, while also supporting queries over that information. Ideally, queries return answers that reflect the most up-to-date data in the database. However, a long-running query or transaction may need to process data that other concurrent transactions are trying to update.

Several contemporary concurrency control techniques attempt to manage such conflicting updates. For example, lock-based techniques may be utilized to prevent multiple transactions from obtaining access to a conflicting data item by causing conflicting transactions to wait. Lock-based techniques occasionally need to abort transactions due to deadlocks, and can lead to long wait queues if there are frequently accessed data items. Other contemporary control techniques includes optimistic methods that check for conflicts only at the end of the transaction, and abort the transaction if conflicts are found, leading to much wasted work if conflicts are frequent. Multi-version timestamp based control techniques keep track of access timestamps for data items, and abort a transaction if the transaction needs to write a data item in a way that is inconsistent with the item's timestamps. Again, significant work may be wasted.

To make queries faster, a commonly used technique is to store derived information in the database to make the retrieval and/or computation over the data more efficient. One example of such derived information is a materialized view, in which the answer to a query (e.g., a sub-query) is explicitly stored in the database. If a later query can use this stored sub-query, then the later query may be answered faster than it would without the availability of the materialized view.

SUMMARY

Embodiments include a method, system, and computer program product for maintaining active queries. An aspect includes executing a query based on data items in at least two relations in a database, where the executing includes outputting a query result and control information associated with the query. Another aspect includes recording the query result and the control information. Another aspect includes receiving a notification that at least one of the data items has been updated subsequent to the executing. A further aspect includes modifying the query result, responsive to the control information, to reflect the data items that were updated subsequent to the executing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to resolving conflicts between active database transactions using an incremental maintenance process. Materialized views are used to store the results of sub-queries in order to improve database performance. Embodiments described herein avoid having to re-compute a materialized view from scratch after every database update by using an incremental view maintenance process that leverages trace information generated during the initial materialization of the view to bring the materialized view up-to-date.

Embodiments described herein resolve conflicts between active transactions by using an incremental maintenance process. When a transaction (T1) commits and updates a data item (e.g., writes a new value or deletes the data item) that an active transaction (T2) requires, T2 is flagged for maintenance with respect to this change. Before T2 completes, it revises its execution in light of all changes made by committed concurrent transactions to required items. Multiple rounds of maintenance may be required. By incrementally revising the execution of T2 rather than aborting and restarting T2, the system can save much of the work that T2 achieved. To identify items that T2 requires, and to quickly determine how changes to those items affect the earlier execution, embodiments described herein include constructing a new kind of structure called a sensitivity index. Sensitivity indexes may also be used for creating materialized views while other transactions are concurrently updating the data, and for efficiently and incrementally keeping materialized views up to date.

Figure 1:
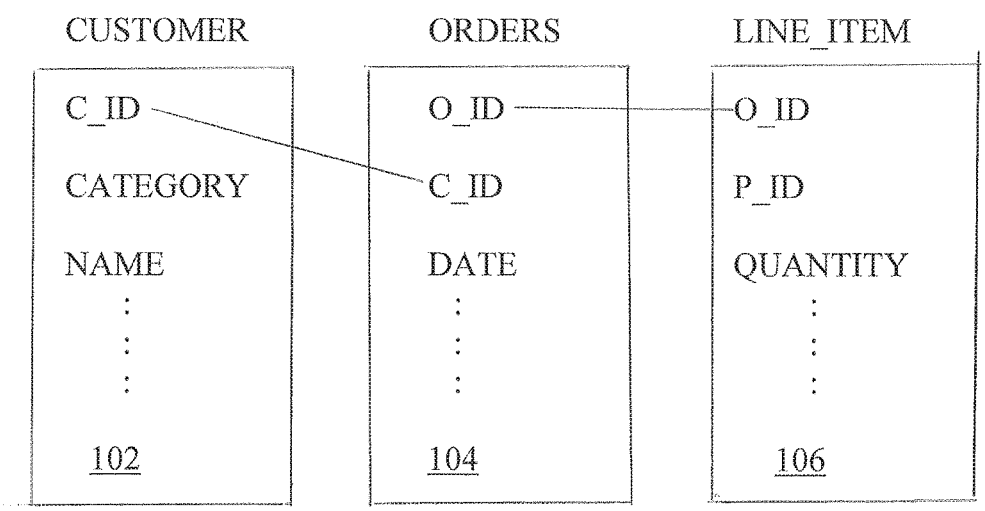
FIG. 1 depicts an example of a database for a retail company.

Referring now to FIG. 1, an example of a database for a retail company that sells products to customers is shown to illustrate various features of embodiments described herein. The database shown in FIG. 1 includes a customer table 102, an orders table 104, and line_item table 106. The customer table 102 stores information about customers who have a unique customer identifier (C_ID), a category name (CATEGORY), and a customer name (NAME), among other attributes. The orders table 104 stores information about orders placed by customers, including an order identifier (O_ID), the customer identifier (C_ID), and an order date (DATE), among other attributes. Each order may include a number of line items, as recorded in the line_item table 106.

Each line item record in the line_item table 106 includes the corresponding order identifier (O_ID), a product identifier (P_ID), and the quantity of the product ordered (QUANTITY), among other attributes. The database may also contain other tables (also referred to herein as "relations") that are not shown in FIG. 1.

A user at the retail company may decide that she would like to profile products for different customer categories. She determines that she would like to know which products are purchased in quantities of five or more by customers in each category. She defines a product category view (Pcat) that may be expressed in structured query language (SQL) as:

Create View Pcat As
Select Distinct CATEGORY, P_ID
From Line_Item L, Orders O, Customer C
Where L.O_ID=O.O_ID And O.C_ID=C.C_ID And L.QUANTITY>=5

In a rule-based language such as Datalog, the same view may be expressed as:

Pcat(CATEGORY,P_ID):—
LineItem(P_ID,O_ID,QUANTITY, . . . ),
Orders(O_ID,C_ID, . . . ),
Customer(C_ID,CATEGORY, . . . ),
QUANTITY>=5.

If the user determines that the Pcat view is used commonly in queries, she may choose to materialize the view, in which case the records that satisfy the view conditions are explicitly stored. The materialization is created in a potentially long-running transaction (T). At the time that the explicit storage occurs, i.e., when T commits, the stored Pcat view must be consistent with the current database state. Consistency is a challenge because additional transactions may have committed after T began, having modified data read earlier by T. Traditional solutions would either abort T once a conflict is identified, or lock out all potentially conflicting transactions while T executes, thereby reducing concurrency. Another contemporary technique includes augmenting a view to store the number of times each record in the view can be derived (i.e., the "support count"), so that the system knows when the last derivation of a record has been removed. A record is removed from the materialized view only when it has no remaining derivations. For this example, assume that the view has been augmented with a count of the number of derivations of each (CATEGORY, P_ID) pair.

In embodiments of the present invention, the database management system chooses an execution plan for executing the query. For the example above, an exemplary execution plan for the Pcat view (referred to herein as "the first execution plan for the Pcat view") may include:

1. Access records in the line item table 106 and the orders table 104 in O_ID order, applying the filtering condition on QUANTITY to records in the line_item table 106.
2. Perform a merge-join of the resulting record sequences.
3. For each record, R, resulting from step 2: merge-join R with records from the customer table 102 on C_ID, retaining just the CATEGORY and P_ID attributes.
4. Identify the unique pairs in the result of the step 3, and store each pair together with the number of duplicates.

To access a relation in a particular order, as described above, the database management system might take advantage of a physical ordering of the stored relation, or it might explicitly sort the relation into the desired order. Alternatively, the database management system may use a suitable index structure to iterate through the relation in key order. Note that if one of the operands to a join is not ordered by the join key, embodiments of the database management system described herein can still use a sequence of merge-joins on one record of the unordered input at a time, as in Step 3 of the first execution plan for the Pcat view shown above.

The first execution plan for the Pcat view shown above has two merge-join steps. A merge-join constructs iterators on its inputs, and advances the trailing iterator based on the join key of the leading iterator, if the keys of the iterators are distinct. This operation is referred to herein as a "seek." For example, if the trailing key is 5 and the leading key is 8, then seek(8) is called on the trailing iterator to advance to the first record in the corresponding join input relation with a key of at least 8. If the keys of all iterators are the same, then output records are generated for all combinations of input records having the same join key, and the iterator for one of the inputs is advanced to the next key, using an operation referred to herein as "next." The sequence of seek and next operations on a pair of inputs is referred to herein as a "trace." A trace is an example of control information, i.e., information about the execution sequence of a particular algorithm on the data.

While seek and next operations can be performed on any ordered input, seeks are particularly efficient when the input is organized in an ordered tree structure. Seeks that correspond to large steps in the key range can then skip many key values and thus save work.

In an exemplary embodiment, sensitivity ranges are derived from the trace of a merge-join using the following three basic rules for a merge-join of relations (or tables) A and B:

a) If the initial keys of A and B are $K_A$ and $K_B$ respectively, and $K_A < K_B$, then B is said to be sensitive to keys in the range $[-\infty, K_B]$. If $K_A > K_B$, then A is said to be sensitive to keys in the range $[-\infty, K_A]$. If the initial keys are equal, then one of the inputs is chosen arbitrarily (say A), and is said to be sensitive to keys in the range $[-\infty, K_A]$.

b) If an input (say A) is positioned at key K, and a next operation is performed on A yielding a new key K', then A is said to be sensitive to keys in the range [K,K']. If K was the last key in A, then K'=∞.

c) If an input (say A) is positioned at key K, and a seek(L) operation is performed on A yielding a new key K', then A is said to be sensitive to keys in the range [L,K']. If no keys in A are at least L, then K'=∞.

Any ordered domain can be handled in this fashion.

Step 3 of the first execution plan for the Pcat view shown above represents a special case of sensitivity ranges that occurs when relation A has a foreign key relationship with relation B, and relation A has just one record. Suppose that one record in relation A has key K. In such a case, assume that the initial seek occurs in relation B rather than relation A, and that the subsequent next operation occurs in relation A rather than relation B. Then, the sensitivity range for relation B will be simply [K,K].

Sensitivity ranges are associated with other attribute values into sensitivity indexes. In particular, all join columns from previous merge-join steps are included. In the first execution plan for the Pcat view shown above, the sensitivity indexes corresponding to the two inputs of the merge-join of Step 2 do not have additional attributes, and the sensitivity index corresponding to the merge-join of Step 3 includes the O_ID from record R.

Sensitivity indexes may also be defined in cases where the merge-join has a nested order. For example, consider the following alternative embodiment of an execution plan for the Pcat view (referred to herein as "the second execution plan for the Pcat view").

1. Access records in the orders table 104 in (C_ID,O_ID) lexicographic order, and records in the customer table 102 in C_ID order.
2. Perform a merge-join of the two inputs on C_ID. The result will have ordered runs of O_ID values for each C_ID.
3. For each C_ID in the resulting intermediate result, in order: iterate through the line_item table 106 in O_ID order, applying the filtering condition on QUANTITY, and perform a merge-join of the two inputs on O_ID, retaining just the CATEGORY and P_ID attributes.
4. Identify the unique pairs in the result of the previous step, and store each pair together with the number of duplicates.

In this second execution plan for the Pcat view, the merge-join in Step 3 happens once for each C_ID value. An embodiment of the database management system described herein would therefore maintain a sensitivity index that identifies sensitivities to O_ID ranges (based on the trace of the merge-join) for each C_ID value.

In an exemplary embodiment, the database management system chooses a plan from among a variety of alternative plans, based on an estimate of the cost of each plan in terms of computational time and resources used. The database management system may choose to materialize all sensitivity indexes, or only some of them, depending on the frequency of updates to certain tables that would benefit from such indexes, and the time and space overhead of maintaining such indexes.

Using the sensitivity index, it is possible to determine, given updates to data items in records (e.g., new records or deleted records) for each of the input relations, whether those changes would have caused the trace to be different. If the changes do not cause the trace to be different, then the database management system can be sure that the join result is insensitive to the presence of these new records. On the other hand, if the trace would have changed in response to some record updates, then the sensitivity indexes provide important information to the database management system. That information allows embodiments of the database management system to incrementally and efficiently maintain the output result using a change-oracle that summarizes key ranges where maintenance might be necessary. In one embodiment, the change-oracle is explicitly materialized. In an alternate embodiment, the change-oracle is not materialized, but rather efficiently derived as needed from the set of matching sensitivity intervals.

As used herein, the term "change-oracle" refers to a query expression that summarizes regions within the space of attribute value combinations. These regions within the space of attribute value combinations are regions within which a query needs to be re-evaluated in response to updates to the underlying data.

As used herein, the terms "sensitivity interval" and "sensitivity range" are used interchangeably to refer to a range of key values derived from a merge-join trace according to the three rules provided above. Modified keys within a sensitivity range have the potential to change the merge-join result.

As used herein, the term "sensitivity index" refers to a data structure representing a collection of entries. For example, a sensitivity index for a join key A of a merge-join is a data structure representing a collection of entries, each entry including a sensitivity range for A, together with zero or more values for other attributes from the merge-join inputs.

Figure 2:
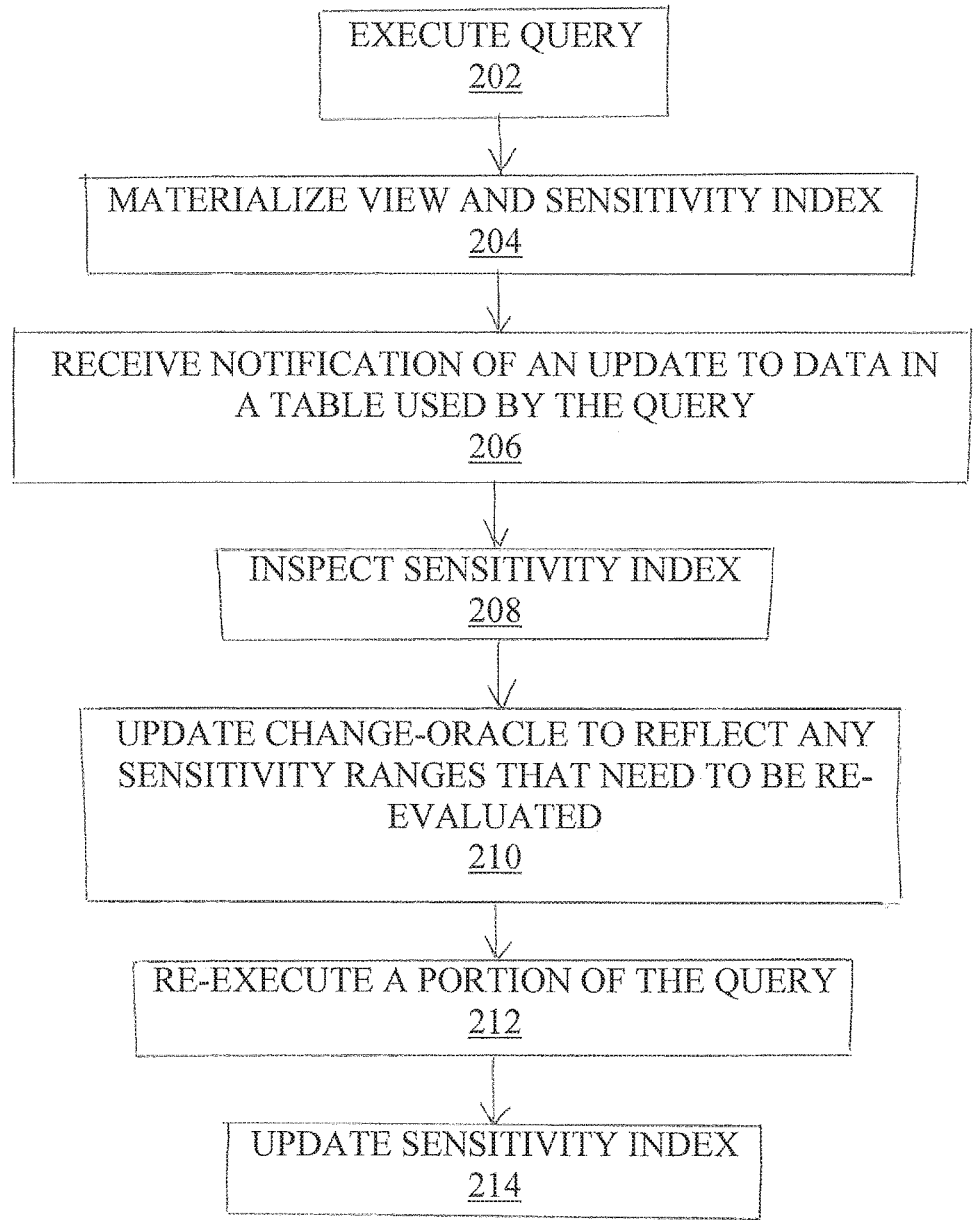
FIG. 2 depicts a process for performing maintenance of active database queries in accordance with an exemplary embodiment.

Referring now to FIG. 2, a process for performing maintenance of active database queries in accordance with an embodiment is generally shown. An example that uses the tables shown in FIG. 1 and the Pcat view described previously is used herein to describe features of embodiments, and it is understood that embodiments are not limited to these tables and view. At block 202, a query, such as the Pcat query described above, is executed using, for example, the first execution plan for the Pcat view. At block 204, the Pcat view is materialized along with corresponding sensitivity indexes. At block 206, a notification of an update to data in a table used by the query is received. For example, consider a situation where a customer with a C_ID of "12345" changes category from category "ABC" to category "DEF." This change is achieved by deleting the row (12345, ABC, . . . ) from the customer table 102 and inserting a new row (12345,DEF, . . . ) into the customer table 102.

At block 208, one or more sensitivity indexes are inspected to determine the impact of this change on the Pcat view. In an embodiment of the example described herein, the system examines the sensitivity index I(O_ID,[C_ID1, C_ID2]) for the customer table 102. There are two cases. In the first case, 12345 is in no [C_ID1,C_ID2] range of any entry in the index (I), and thus this customer has not placed any orders having a line item quantity over 5, and so the update has no effect on the final result. Neither the deletion nor the insertion changes the merge-join result. Additionally, no changes are needed to the sensitivity indexes, because 12345 must have been skipped in the sensitivity index for the other input. In the second case, 12345 is in the [C_ID1, C_ID2] range of at least one entry in I, and thus, the final result may change, because customer 12345 has previously ordered a line item with a quantity over five. In response to the initial deletion of customer 12345, the system identifies all O_ID values in I for which the [C_ID1,C_ID2] range includes 12345. In an embodiment, determining whether 12345 is in the [C_id1,C_id2] range of some entries in I is made easier by using a special data structure, for example a B-tree-like realization of a segment tree, to permit fast queries of intervals which contain 12345.

Referring now to block 210 of FIG. 2, the change-oracle is updated to reflect any sensitivity ranges that need to be re-evaluated based on the analysis performed at block 210. For example, for each matching O_ID, the pair (O_ID, 12345) is added to the change-oracle for determining the parts of the query that need to be re-evaluated. During the subsequent insertion of (12345,DEF), the active database query maintenance processing will identify matching O_ID range pairs in I, which will also be added to the change-oracle. In this example, in which the insertion and deletion have the same C_ID, the ranges coincide with the ranges identified during the deletion, but in a general set of insertions and deletions, the ranges may differ.

At block 212, once the change-oracle has been computed, the change-oracle is used to incrementally modify the query result. The change-oracle defines the subset of the join attribute combinations that could potentially have changed as a result of the updates. The body of the query is re-executed using the original plan, but limited to (O_ID,C_ID) pairs from the change-oracle. The maintenance process identifies new intermediate records that were not previously present, as well as old intermediate records that are no longer present. In the example above, the initial join between the line_item table 106 and the orders table 104 is repeated, but only for the (O_ID,C_ID) pairs in the change-oracle. The line_item table 106 is filtered by O_ID only; and the orders table 104 is filtered by O_ID id and C_ID. The result of this initial join is then joined on C_ID with the customer table 102, but only for customers whose C_ID is in the change-oracle. The portion of the join limited to the change-oracle is computed both in the pre-update state, and in the post-update state. The difference between these two states corresponds to the net change that needs to be applied to the query result.

In the present example, suppose that customer 12345 has purchased precisely 3 line items, for distinct products P1, P2 and P3, each with a quantity of more than 5. The change-oracle will identify the O_IDs of orders containing these 3 high quantity line items, paired with C_ID 12345. The before value of the join, projected onto the category and product, will be {(ABC,P1),(ABC,P2),(ABC,P3)}, while the after-value of the join will be {(DEF,P1),(DEF,P2),(DEF,P3)}. The active database query process will then be able to decrement the derivation counts for category ABC for the 3 products, and increment the derivation counts for category DEF for those products. If the count is decremented to zero, the row is deleted, and if a row whose derivation count is incremented did not previously exist, it is inserted with a derivation count of 1.

In an embodiment, the storage structures for the tables are designed to permit the efficient identification of newly inserted and deleted records. For example, copy-on-write page-level versioning using a B-tree data structure would allow the system to skip sub-trees common to both versions. Cascading trees would also perform well because they concentrate recent changes into a small number of pages.

Turning now to block 214, one or more sensitivity indexes are updated. The processing performed by blocks 212 and 214 are referred to herein as a "maintenance process." During the maintenance process, the sensitivity indexes are updated as the incremental changes are applied. In the example above, there is no net change to the sensitivity indexes because the deleted record with key 12345 was replaced with an inserted record having the same key, within the same transaction. Nevertheless, other changes, such as the insertion of new orders or the deletion of existing line items would affect the trace and thus necessitate changes to the sensitivity indexes.

Because the sensitivity indexes are updated, embodiments support multiple rounds of maintenance being performed on a query.

Sensitivity indexes remain useful for maintenance even if they contain additional intervals beyond those strictly defined by the trace. The presence of additional intervals does not affect the correctness of the method. Additional intervals may incur a small amount of extra work during query result maintenance. While embodiments could maintain the sensitivity indexes so that they exactly reflect the trace of the query evaluation on the new data, it may be more efficient to maintain the sensitivity indexes in a way that sometimes includes more intervals than is strictly necessary. In a typical application context, the benefit of simpler sensitivity index maintenance may outweigh the cost of additional work in query result maintenance.

In an embodiment, the sensitivity index maintenance proceeds as follows. When matching intervals are found in sensitivity indexes during query result maintenance, they are removed. During the maintenance process, new sensitivity intervals are emplaced to reflect the iterated seek/next operations that were performed. The resulting sensitivity index does not necessarily represent an exact record of the trace of a single query evaluation, and may contain more sensitivity intervals than necessary. Nevertheless, it does cover all intervals in which a data change would require maintenance.

Figure 3:
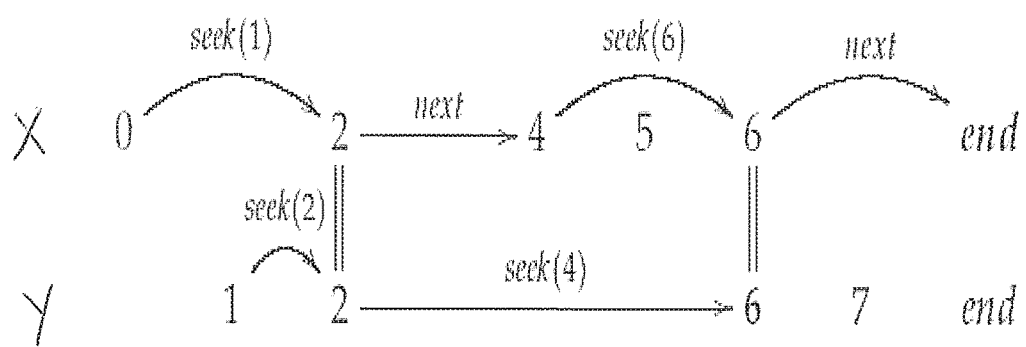
FIG. 3 depicts an example of a trace of a query that includes a merge-join process.

Referring now to FIG. 3, a trace for a query is generally shown in accordance with an embodiment. To illustrate the maintenance of sensitivity indexes, suppose that the database management system is performing a merge-join of two tables X and Y. As shown in FIG. 3, suppose that table X contains the keys 0, 2, 4, 5, and 6, and table Y contains the keys 1, 2, 6, and 7. FIG. 3 shows a resulting trace. Deriving sensitivity ranges from the trace of a merge-join using the embodiment described above results in the sensitivity ranges for table X being {[1,2],[2,4],[6,6],[6,∞]}, and the sensitivity intervals for table Y being {[-∞,1],[2,2],[4,6]}.

Now suppose that the following updates occur to table X and table Y: key 5 is removed from table X; key 8 is inserted into table X; key 2 is removed from table Y; and key 3 is inserted into table Y. The database management system would perform maintenance on the join result, while updating the trace and the sensitivity indexes. The change-oracle for these updates would be {[2,2],[6,∞]}, reflecting the determination that the removal of key 2 from table Y and the insertion of key 8 into table Y may have an impact on the previous query results. In an embodiment, during maintenance, the change-oracle is treated by the database management system as a third input to the join, for which seek and next operations are performed. Since maintenance is incremental, the change-oracle is likely to be small relative to the entire key range, and so seek and next operations on the change-oracle would be preferable to such operations on either input relation. Based on the change-oracle being {[2,2],[6,∞]}, the maintenance process jumps straight to key 2 and finds that key 2 is no longer in the merge-join result because it has been deleted from table Y. During this maintenance, the database management system determines that the seek(2) operation in table Y no longer leads to key 2, but to key 3 instead. As a result, the sensitivity index for table Y has [2,2] replaced by [2,3].

The removal of key 5 from table X does not affect the result or the trace, because the seek(6) operation skipped over key 5 in the initial trace, and similarly for the insertion of key 3 into table Y. The insertion of key 8 into table X does not change the result, but does change the trace, since the next operation after key 6 would hit key 8 rather than the end marker. As a result, the database management system will replace [6, ∞] with [6,8] for the sensitivity index on table X, and add [8,∞] to the sensitivity index for table Y. These changes occur during the processing of the range [6,∞] for maintenance, as specified by the change-oracle. The net result of maintenance is that: (a) key 2 is removed from the join result; (b) the sensitivity intervals for table X are now {[1,2],[2,4],[6,6],[6,8]}; and (c) the sensitivity intervals for table Y are now {[-∞,1],[2,3],[4,6],[8,∞]}. The sensitivity index for X includes [2,4] rather than [3,4], the interval that would be in the trace of the updated data. The system keeps the larger interval [2,4] in order to simplify the maintenance process for the sensitivity indexes.

Depending on the application, maintenance can be performed immediately after every transactional update, or in a deferred fashion in response to a batch of updates.

In another embodiment, sensitivity indexes have additional attributes besides the join attributes. It is often beneficial to include the attributes that are output by the query in the sensitivity index, as illustrated by the following example. Consider the Pcat view above, but instead of augmenting the view with the count of the number of derivations for each (CATEGORY,P_ID) pair, the database management system augments the view with the minimum C_ID, grouped by CATEGORY and P_ID. The benefit of recording the minimum C_ID rather than the count is that we may be able to avoid some of the work in maintaining the counts. The count needs to be changed on every update to a group, while the minimum C_ID does not need to be updated when the C_ID for the update is larger than the current minimum C_ID.

Consider the sensitivity index for step 3 of the first execution plan for the Pcat view described above. Suppose that instead of recording just (O_ID,[C_ID1,C_ID2]), the system records (P_ID,O_ID,[C_ID1,C_ID2]) in the sensitivity index I. When an update to the customer table 102 occurs, the database management system checks I to find entries whose C_ID ranges include the C_ID of the updated row. Because the database management system now has access to the P_ID, it can determine the (CATEGORY,P_ID) pair that would be affected by the update, and read the existing view to obtain the minimum current C_ID (call it M) for the group. If the current C_ID is greater than M, or equal to M for an insertion, then this update can be ignored because it does not change the view. If the current C_ID is smaller than M, and the update is an insertion, then M is replaced by the current C_ID. If the current C_ID is less than or equal to M and the update is a deletion, then a more expensive maintenance operation will be triggered to identify the new minimum C_ID for this group, or the absence of any remaining C-ids for the group. This choice of maintenance strategy may be advantageous if the frequency of updates that trigger the more expensive maintenance operation is sufficiently small.

Figure 4:
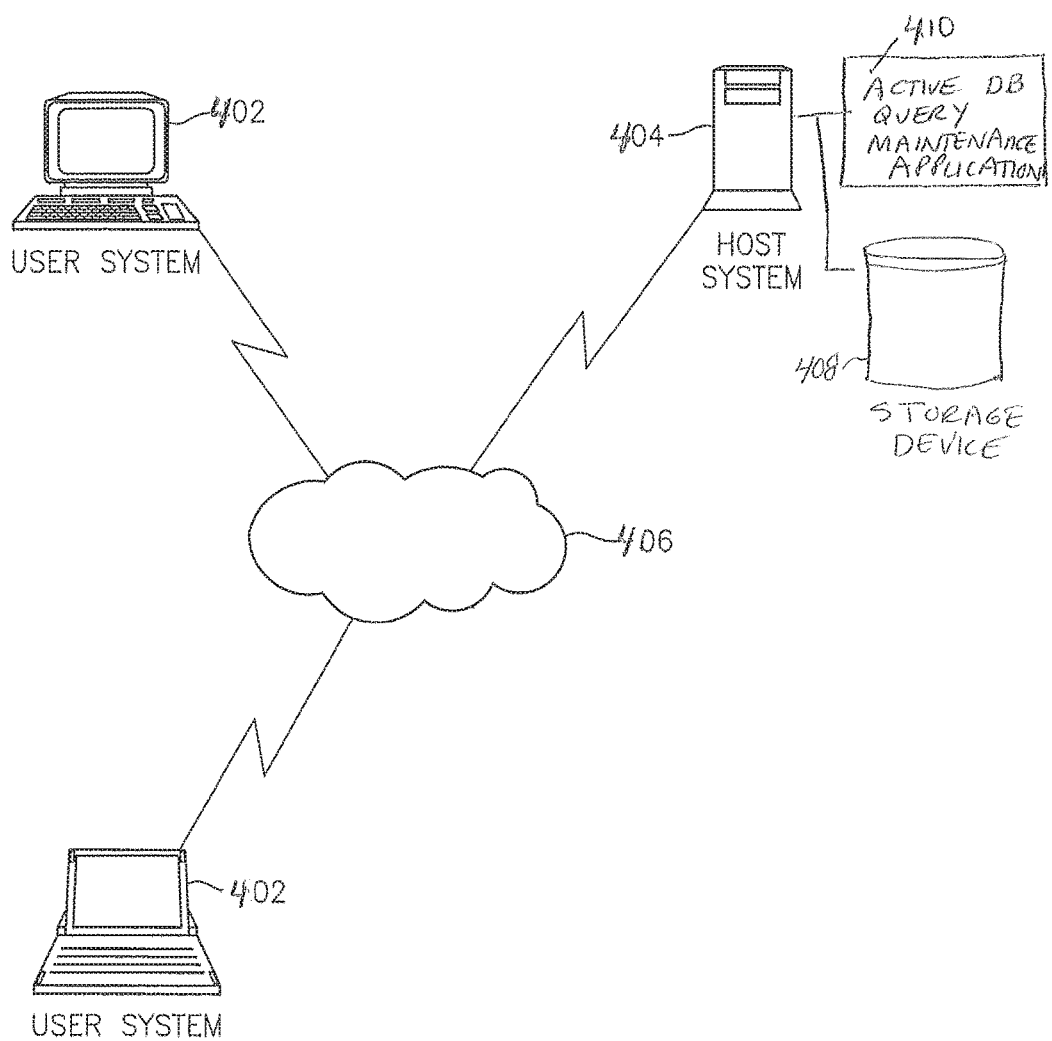
FIG. 4 depicts a block diagram of a system upon which maintenance of active database queries may be implemented according to an embodiment of the present invention.

Referring to FIG. 4, a block diagram of an exemplary system for automatically performing maintenance of active database queries is generally shown. The system includes an active database query maintenance application 410 that is executed by one or more computer programs located on a host system 404. In an embodiment, all or a portion of the active database query maintenance application 410 is part of a database management system executing on the host system 404. In another embodiment, all or a portion of the active database query maintenance application 410 is a component of a system that supports both transactions and queries.

The system depicted in FIG. 4 includes one or more user systems 402 through which users (e.g., end users, database administrators) at one or more geographic locations may contact the host system 404 to initiate programs that execute database queries and/or transactions. The user systems 402 are coupled to the host system 404 via a network 406. Each user system 402 may be implemented using a general-purpose computer executing a computer program for carrying out the processes described herein. The user systems 402 may be personal computers (e.g., a lap top, a tablet computer, a cellular telephone) or host attached terminals. If the user systems 402 are personal computers, the processing described herein may be shared by a user system 402 and the host system 404. The user systems 402 may also include game consoles, network management devices, and field programmable gate arrays. In addition, multiple user systems 402 and/or host systems 404 may be concurrently operating to perform active database query maintenance.

The network 406 may be any type of known network including, but not limited to, a wide area network (WAN), a local area network (LAN), a global network (e.g. Internet), a virtual private network (VPN), a cloud network, and an intranet. The network 406 may be implemented using a wireless network or any kind of physical network implementation known in the art. A user system 402 may be coupled to the host system through multiple networks (e.g., cellular and Internet) so that not all user systems 402 are coupled to the host system 404 through the same network. One or more of the user systems 402 and the host system 404 may be connected to the network 406 in a wireless fashion. In one embodiment, the network is the Internet and one or more user systems 402 execute a user interface application (e.g. a web browser) to contact the host system 404 through the network 406. In another exemplary embodiment, the user system 402 is connected directly (i.e., not through the network 406) to the host system 404. In a further embodiment, the host system 404 is connected directly to or contains the storage device 408.

The storage device 408 includes data relating to active database query maintenance and may be implemented using a variety of devices for storing electronic information. In an embodiment, data stored in the storage device 408 includes, but is not limited to, one or more database tables, materialized views, sensitivity ranges, sensitivity indexes, sensitivity ranges, change-oracles, views and plans. It is understood that the storage device 408 may be implemented using memory contained in the host system 404 or that it may be a separate physical device. The storage device 408 may be logically addressable as a consolidated data source across a distributed environment that includes the network 406. Information stored in the storage device 408 may be retrieved and manipulated via the host system 404 and/or via a user system 402.

The host system 404 depicted in FIG. 4 may be implemented using one or more servers operating in response to a computer program stored in a storage medium accessible by the server. The host system 404 may operate as a network server (e.g., a web server) to communicate with the user system 402. The host system 404 handles sending and receiving information to and from the user system 402 and can perform associated tasks. The host system 404 may also include a firewall to prevent unauthorized access to the host system 404 and enforce any limitations on authorized access. For instance, an administrator may have access to the entire system and have authority to modify portions of the system. A firewall may be implemented using conventional hardware and/or software as is known in the art.

The host system 404 may also operate as an application server. The host system 404 executes one or more computer programs, including an active database query maintenance application 410, to provide aspects of embodiments as described herein. Processing may be shared by the user system 402 and the host system 404 by providing an application to the user system 402. Alternatively, the user system 402 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Embodiments of sensitivity indexes as described herein provide several advantages. One advantage is that the compact in situations when many records share a key because embodiments of the sensitivity index have one an entry per key, rather than one entry per record. Another advantage is that the size of a sensitivity index is typically proportional to the size of the smallest input. Another advantage is that embodiments of sensitivity indexes can be built from arbitrary ordered inputs including results of complex sub-queries, whether the input itself has an index structure or not. A further advantage of embodiments of sensitivity indexes is that they are easy to build with minimal overhead at the time that the join is computed and they can be maintained with low overhead in the face of updates to the input relations. A further advantage of embodiments of sensitivity indexes is that they apply directly to multi-way merge-joins on a common attribute, and do not need to be expanded as a series of pairwise joins.

Embodiments of sensitivity indexes can be used in conjunction with other techniques. For example, they may be used to support the maintenance of a complex expression by additionally maintaining queries corresponding to sub-expressions of the given expression.

Embodiments of the maintenance techniques described here have many applications, including but not limited to the following examples. They can be used to keep a materialized view up to date either during or after the initial materialization. They can be used to enhance the concurrency of a database management system in the presence of long running transactions. In addition, they can be used in recursive query processing to derive new data in a predicate based on changes to the predicate observed in the previous iteration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method to maintain active queries, the method comprising:
   executing a query based on data items in at least two relations in a database, the executing including outputting a query result and a sensitivity index associated with the query, the sensitivity index indicating potential changes to the database that may impact the query result; and
   recording the query result and the sensitivity index.

2. The method of claim 1, further comprising:
   receiving, subsequent to the executing, a notification of a first update to a first data item within the database; and
   modifying, in response to determining that the first update may impact the query result based on the sensitivity index, the query result to reflect an update of the first data item; and
   updating the sensitivity index based on the modifying of the query.

3. The method of claim 2, further comprising:
   receiving, subsequent to updating the sensitivity index, a second notification of a second update to a second data item within the database; and
   modifying, in response to determining that the second update may impact the query result based on the sensitivity index, the modified query result to reflect an update of the second data item; and
   updating the sensitivity index based on the modifying of the modified query.

4. The method of claim 2, wherein the transaction executes concurrently with another transaction and the first update to the first data item was controlled by the another transaction in response to the another transaction committing to the database.

5. The method of claim 1, wherein the executing includes performing a merge-join operation and the sensitivity index is generated based on merge-join trace information.

6. The method of claim 1, wherein the sensitivity index identifies key values that, if modified, have a potential to change the query result.

7. The method of claim 1, wherein the sensitivity index associated with the query is based on trace information collected during the executing.

8. The method of claim 1, wherein the recording includes materializing a view of the query result.

9. The method of claim 1, wherein the query is one of a plurality of queries that form a transaction that is required to be consistent with a state of the database at the time that the transaction commits.

10. A system for maintaining active queries, comprising:
    a memory having computer readable computer instructions; and
    a processor for executing the computer readable instructions to perform a method comprising:
       executing a query based on data items in at least two relations in a database, the executing including outputting a query result and a sensitivity index associated with the query, the sensitivity index indicating potential changes to the database that may impact the query result; and
    recording the query result and the sensitivity index.

11. The system of claim 10, further comprising:
    receiving, subsequent to the executing, a notification of a first update to a first data item within the database; and
    modifying, in response to determining that the first update may impact the query result based on the sensitivity index, the query result to reflect an update of the first data item; and
    updating the sensitivity index based on the modifying of the query.

12. The system of claim 11, wherein the method further comprises:
    receiving, subsequent to updating the sensitivity index, a second notification of a second update to a second data item within the database; and
    modifying, in response to determining that the second update may impact the query result based on the sensitivity index, the modified query result to reflect an update of the second data item; and
    updating the sensitivity index based on the modifying of the modified query.

13. The system of claim 11, wherein the transaction executes concurrently with another transaction and the first update to the first data item was controlled by the another transaction in response to the another transaction committing to the database.

14. The system of claim 10, wherein the executing includes performing a merge-join operation and the sensitivity index is generated based on merge-join trace information.

15. The system of claim 10, wherein the sensitivity index identifies key values that, if modified, have a potential to change the query result.

16. The system of claim 10, wherein the sensitivity index associated with the query is based on trace information collected during the executing.

17. The system of claim 10, wherein the recording includes materializing a view of the query result.

18. The system of claim 10, wherein the query is one of a plurality of queries that form a transaction that is required to be consistent with a state of the database at the time that the transaction commits.

19. A computer program product for maintaining active queries, the computer program product comprising a non-transitory computer readable storage medium having computer-readable program code embodied thereon, which when executed by a computer processor, causes the computer processor to implement a method, the method comprising:

executing a query based on data items in at least two relations in a database, the executing including outputting a query result and a sensitivity index associated with the query, the sensitivity index indicating potential changes to the database that may impact the query result; and recording the query result and the sensitivity index.

20. The computer program product of claim 19, wherein the executing includes performing a merge-join operation and the sensitivity index is generated based on merge-join trace information.

\* \* \* \* \*